United States Patent
Manyam et al.

(10) Patent No.: US 7,072,552 B2
(45) Date of Patent: Jul. 4, 2006

(54) OPTICAL FIBER WITH MICRO-STRUCTURED CLADDING

(75) Inventors: Upendra H. Manyam, Hartford, CT (US); Kanishka Tankala, South Windsor, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 11/004,344

(22) Filed: Dec. 2, 2004

(65) Prior Publication Data

US 2006/0120678 A1    Jun. 8, 2006

(51) Int. Cl.
*G02B 6/02*    (2006.01)

(52) U.S. Cl. .................. 385/125; 385/126; 65/403

(58) Field of Classification Search ........ 385/123–128, 385/131–133; 65/385–405, 413–435
See application file for complete search history.

(56) References Cited

U.S. PATENT DOCUMENTS

| | | | |
|---|---|---|---|
| 5,907,652 A | 5/1999 | DiGiovanni et al. | |
| 6,445,861 B1 | 9/2002 | Shaw et al. | |
| 6,477,307 B1 | 11/2002 | Tankala et al. | |
| 6,516,124 B1 * | 2/2003 | Po ............................. | 385/126 |
| 6,522,820 B1 | 2/2003 | Wang | |
| 6,594,429 B1 | 7/2003 | White | |
| 6,625,363 B1 | 9/2003 | Carter et al. | |
| 6,687,445 B1 | 2/2004 | Carter et al. | |
| 6,766,088 B1 | 7/2004 | Hasegawa et al. | |
| 6,775,450 B1 | 8/2004 | Maroney et al. | |
| 6,779,364 B1 | 8/2004 | Tankala et al. | |
| 6,782,148 B1 | 8/2004 | Eggleton et al. | |
| 2003/0059185 A1 | 3/2003 | Russell et al. | |
| 2003/0165313 A1 | 9/2003 | Broeng et al. | |
| 2004/0069019 A1 | 4/2004 | Carter et al. | |
| 2004/0156606 A1 | 8/2004 | Po | |
| 2004/0208464 A1 | 10/2004 | Po | |

OTHER PUBLICATIONS

U.S. Appl. No. 10/820,475, filed Apr. 8, 2004, Samson et al.
U.S. Appl. No. 10/875,749, filed Jun. 24, 2004, Tankala et al.
U.S. Appl. No. 10/910,924, filed Aug. 3, 2004, Farroni et al.

(Continued)

*Primary Examiner*—Phan Palmer
(74) *Attorney, Agent, or Firm*—Peter J. Rainville

(57) ABSTRACT

An optical fiber having a length can include a core and at least one cladding disposed about the core, where the one cladding can comprise at least first volumetric regions having a first refractive index $n_1$ and second volumetric regions having a second refractive index $n_2$, different from $n_1$, and the first and second volumetric regions in any cross-section taken through the fiber can be randomly intermingled with one another, where the random intermingling of the first and second volumetric regions changes with changes in the location of the cross-section along the length of the fiber.

26 Claims, 1 Drawing Sheet

OTHER PUBLICATIONS

U.S. Appl. No. 10/911,812, filed Aug. 5, 2004, Farroni et al.
U.S. Appl. No. 10/912,666, filed Aug. 5, 2004, Farroni et al.
Legrange et al.; "Optical Reliability of Cladding Pump Fiber for High Power Communication Networks"; Proceedings—IEEE MILCOM Conference; vol. 1, 1999, pp. 690-693.

Kozlov et al.; "Silica-Air Double-Clad Optical Fiber"; IEEE Photonics Technology Letters, vol. 12, No. 8, Aug. 2000, pp. 1007-1009.

Limpert et al.; "High-power air-clad large-mode-area photonic crystal fiber laser"; Optics Express, vol. 11, No. 7, Apr. 7, 2003, pp. 818-823.

* cited by examiner

OPTICAL FIBER WITH MICRO-STRUCTURED CLADDING

FIELD OF THE INVENTION

The present invention relates to optical waveguides, and more particularly to optical fibers, such as, for example, an optical fiber having a micro-structured region.

BACKGROUND OF THE INVENTION

Optical fibers with selected claddings (e.g., micro-structured claddings) are well known, for example from U.S. Pat. Nos. 5,907,652, 6,522,820, 6,594,429, 6,766,088 and 6,775,450. In the fibers described in one or more of these patents an apparent aim is to introduce some regions of air or other selected refractive index into the involved cladding to give it a different (e.g., lower) effective index than would otherwise be the case and thereby give the fiber characteristics, such as increased power handling ability, attractive for some applications.

In the known fibers having selected cladding designs, such as, for example, micro-structured claddings, the formation of the micro-structure can be an expensive and/or difficult matter, and usually is achieved by the making of holes in the cladding material of a preform from which the fiber is drawn, and these holes become extended over great lengths in the drawing of the fiber from the preform.

Although one or more of the known optical fibers may have had certain features that represented or were thought to represent an advance in the art when introduced, disadvantages or drawbacks remain, particularly with regard to certain applications.

Accordingly, it is an object of the present invention to provide an improved optical fiber that can address one or more of the disadvantages or drawbacks of the prior art.

Other objects and advantages of the invention will be apparent from the following description of preferred embodiments.

SUMMARY OF THE INVENTION

In one aspect, the invention provides an optical fiber having a length. The fiber can include a core and at least one cladding disposed about the core, and the one cladding can include at least first volumetric regions of first refractive index $n_1$ and second volumetric regions of second refractive index $n_2$, different from $n_1$. The first and second volumetric regions in any cross-section taken through the fiber can be randomly intermingled with one another, and the random intermingling of the first and second volumetric regions can change with changes in the location of the cross-section along the length of the fiber. The fiber can include the feature wherein for substantially any line extending parallel to the core and in the one cladding, the line will pass at least once from one of the volumetric regions to a volumetric region having a different index.

The one cladding can, in one practice, contain essentially no volumetric regions other than the first and second volumetric regions. The first volumetric regions can include silica-based material and the second volumetric regions can be hollows. The first volumetric regions of silica-based material can be fused to one another to form a sintered body defining the hollows. The hollows can be empty, or can contain a gas, such as, for example, air. The first volumetric regions can include a first silica-based material of refractive index $n_1$ and the second volumetric regions can include a second silica-based material of refractive index $n_2$, and the first and second volumetric regions can be fused to one another to form a rigid body. The one cladding can be located immediately adjacent to the core. The fiber can have an inner cladding disposed about the core and an outer cladding disposed about the inner cladding, and the one cladding can be the outer cladding. The inner cladding can be a pump cladding for receiving pump light for pumping an active material, such as a rare earth, such that the active material can provide light having a wavelength that is different than the wavelength of the pump cladding. The one cladding can be the inner cladding.

The fiber can have an inner cladding disposed about the core and an outer cladding disposed about the inner cladding, where the inner cladding can include a silica-based material, and the one cladding can be the outer cladding. The outer cladding can be surrounded by a region of a silica-based material. At least the first volumetric regions of the outer cladding can be made of a silica-based material. The first volumetric regions of the outer cladding can be fused to one another to form a sintered body and the second volumetric regions can be hollows in the sintered body. Both the first and second volumetric regions can be made of a silica-based material. The first and second volumetric regions can be fused to one another.

In another aspect, the present invention can provide an optical fiber of an elongate length, where the fiber can include a core, a first cladding disposed about the core, and a second cladding disposed about the first cladding. The second cladding can include first volumetric regions having a first index of refraction and second volumetric regions having a second index of refraction that is different than the first index of refraction. The second cladding can have an effective index of refraction that is less than one of the indices of refraction. At least some of the first volumetric regions can be truncated such that they do not extend within the fiber for the entire length of fiber. One of the first and second volumetric regions can comprise hollows. One of the first and second volumetric regions can comprise hollows containing a gas. The gas can be air.

The invention can include methods.

In one aspect, the invention provides a method of making an optical fiber having a length and having at least one cladding. The method can include making an early stage preform having an elongate core made of a first silica-based material, an outer region disposed about the core, and an intermediate region located radially inwardly of the outer region; improving the early stage preform to a later stage preform by at least disposing first particles in the intermediate region so that the later stage preform includes in the intermediate region first volumetric regions constituted by the first particles intermingled with the second volumetric regions constituted by something other than the particles of the first volumetric regions; and drawing an optical fiber from a preform that includes at least the later stage preform.

Disposing the first particles in the intermediate region can include selecting the particles to be of such sizes and shapes, and selecting the conditions attending the disposing of the particles into the intermediate region, so that after the intermediate region includes the particles hollows are intermixed with the particles in the intermediate region. Selecting the conditions can include mixing a gas with the particles as they are disposed in the intermediate region so that the hollows include the gas. The gas can be air. Second particles having a different index of refraction than the first particles can be disposed in the intermediate region and the second volumetric regions can be constituted by the second particles.

As can be seen from the following description, in certain embodiments the invention can provide an improved method of making an optical fiber with a micro-structured cladding. The invention can also provide, in certain embodiments, an improved double-clad fiber wherein at least two of the claddings comprise a glass. One of the claddings, such as the inner or pump cladding, can have high numerical aperture. "Double-clad", as used herein, means a fiber having at least two claddings, and can include a fiber having more than two claddings, such as, for example, a triple-clad fiber. As used herein the term "optical", such as is used in the term "optical waveguide" or "optical fiber", is used to mean a waveguide or fiber, as the case may be, for use with electromagnetic energy, as is well understood by those of ordinary skill in the art. It is inappropriate for the term "optical" to be limited to the range of visible wavelengths, as is readily appreciated by one of ordinary skill, but perhaps not appreciated by one not of ordinary skill inclined to inappropriately rely solely on a layman's dictionary, which may restrict the term "optical" to visible wavelengths.

The invention also resides in further features and details of the involved optical fiber and its method of making described in the following description and drawings of preferred embodiments and in the claims.

Several features of the invention are described above and elsewhere herein. Not every specific combination of features according to which the invention can be practiced is explicitly enumerated herein. In general, it is understood by one of ordinary skill in the art that features described in conjunction with one embodiment can be included in any other embodiment described herein, excepting of course combinations of features that are mutually exclusive.

Further advantages, novel features, and objects of the invention will become apparent from the following detailed description of non-limiting embodiments of the invention when considered in conjunction with the accompanying FIGURES. For purposes of clarity, not every component is labeled in every one of the following FIGURES, nor is every component of each embodiment of the invention shown where illustration is not considered necessary to allow those of ordinary skill in the art to understand the invention.

Figure 1:
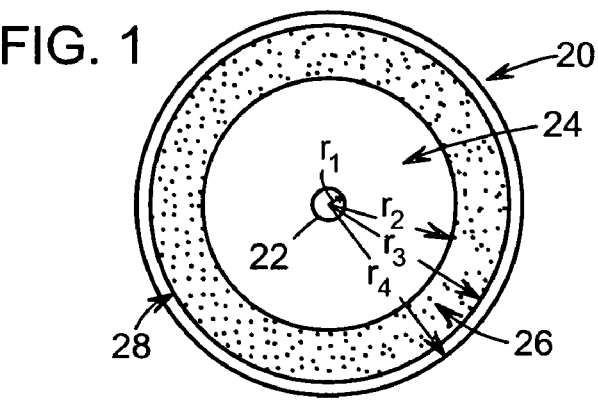
FIG. 1 is a cross-sectional view through an optical fiber according to one embodiment of the invention.

DESCRIPTION OF PREFERRED
EMBODIMENTS

Optical fibers having a region (e.g., a cladding or a core) having an increased numerical aperture can be useful in certain applications, such as, for example, high-power fiber lasers or amplifiers. For example, in a double-clad fiber, it is often advantageous for the inner or pump cladding to have a high numerical aperture. It can also be desirable for the core of a fiber to have a higher numerical aperture. One approach to raise the numerical aperture of a region is to raise the index of refraction of the host material (e.g., silica) of a region of an optical fiber by doping the region with an index raising dopant (e.g., germanium). Where the core of a fiber is doped, the cladding can, for example, consist or consist essentially of silica or can comprise silica that includes a dopant, such as, for example, one or more of germanium, silica or phosphorus. Realization of fibers of high numerical aperture by raising the index of a region can be limited by the processing difficulties encountered in handling heavily germanium-doped glass due to extremely high stresses, and by the increased attenuation due to the high Rayleigh scattering coefficient of germania. Other dopants such as alumina, titania or phosphorous can also be added to silica to increase the refractive index, but again, this is accompanied by increased attenuation. In the case of active fibers for optical amplifiers and lasers such as those with rare-earth doping, a compositional change of a region, and hence the numerical aperture, are also restricted by spectroscopic requirements on the absorption and fluorescence. Hence other methods should be found to obtain increased numerical apertures than by doping alone. Because the numerical aperture of one region relative to another is related to the index difference between the regions, one common method is to simply lower the index of refraction of, for example, the outer cladding of a double-clad fiber to raise the numerical aperture of the inner cladding, about which the outer cladding is disposed. For example, a low index polymer can be used as an outer cladding to obtain an increased index difference with the inner cladding. Polymer claddings have significant drawbacks of their own which can limit the performance of, for example, amplifiers or lasers. For instance, polymers are unable to withstand very high pump power levels. Polymer clad fibers are also more difficult to cleave and splice compared to fibers made entirely of glass.

In keeping with the invention it is proposed to solve the above and other problems by lowering the refractive index of the pump cladding to obtain numerical apertures higher than is possible by conventional doping of silica glass. A region of the fiber can include at least two sets of volumetric regions of low and high refractive index, such that the material of that cladding in bulk appears to have an effective index of refraction that is lower than one of the indices. Typically, the effective index of refraction has a value that is between the two indices. In one embodiment of the invention, the volumetric regions can include glass and air, formed by a continuous sintered body of silica having randomly distributed hollows or pores.

The volumetric regions are typically randomly distributed over cross-sections of the fiber and their sizes and shape, together with the rate at which the random cross-sectional distribution changes in going along the length of the fiber, are such that in traveling along the length of the involved cladding a beam of light transitions rapidly and repeatedly from one index of refraction to the other in order for the cladding to appear as a homogeneous material of non-varying low index of refraction. Preferably the micro-structure of the cladding is such that in traveling along straight lines of a selected length in the cladding micro-structure and generally parallel to the length of the fiber, a transition is made at least once from one index of refraction to another index of refraction. In various embodiments of the invention the selected length can be 0.5 meters, 1 meter, 5 meters, or ten meters.

Figure 2:
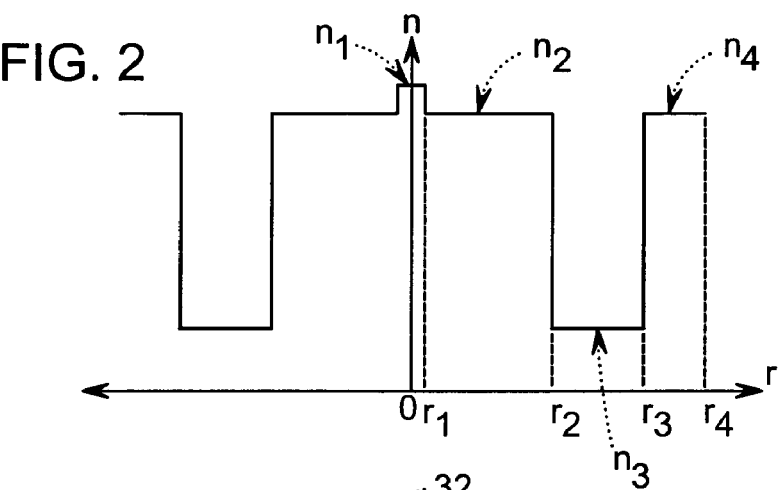
FIG. 2 is a graph showing a possible refractive index profile in the radial direction for the fiber of FIG. 1.

An example of a fiber having a cladding as described above is given by the fiber 20 shown in FIG. 1. This fiber 20 is a high numerical aperture double-clad fiber. The fiber 20 includes a core 22 having an index of refraction $n_1$. The core 22 can comprise, for example, doped silica glass. The inner cladding 24, disposed about the core 22, can comprise index of refraction $n_2$. The inner cladding 24 can act not only as the waveguide cladding for light of the core 22, but can also act as a multimode core for pump energy. FIG. 2 illustrates one example of a radial index of refraction profile of this fiber. Both the core 22 and the cladding 24 can be pure silica or doped such that $n_1 > n_2$. The outer or second cladding 26 is disposed about the inner cladding 24. The outer cladding 26 can include a lower effective index of refraction $n_3 < n_2$ due to its air-glass intermingled microstructure. Finally, the glass region 28 can be disposed about the outer cladding 26 to increase the surface strength of the fiber 20 and to provide mechanical integrity to the all-glass structure. If desired, a polymer buffer can be used to protect the all-glass fiber 20, as in conventional optical fibers.

In another embodiment a mixture of pure silica and borosilicate beads are used when making a preform from which the fiber is drawn to provide an effective index $n_3 < n_2$. That is, a micro-structured cladding is formed by volumetric regions of pure silica having an index of refraction $n_a$ randomly intermingled with volumetric regions of borosilicate having an index of refraction $n_b$. In this case $n_a$ does not equal $n_b$ and the resulting low index of refraction of the cladding is $n_c$ with $n_c$ being between the indices na and $n_b$.

Figure 3:
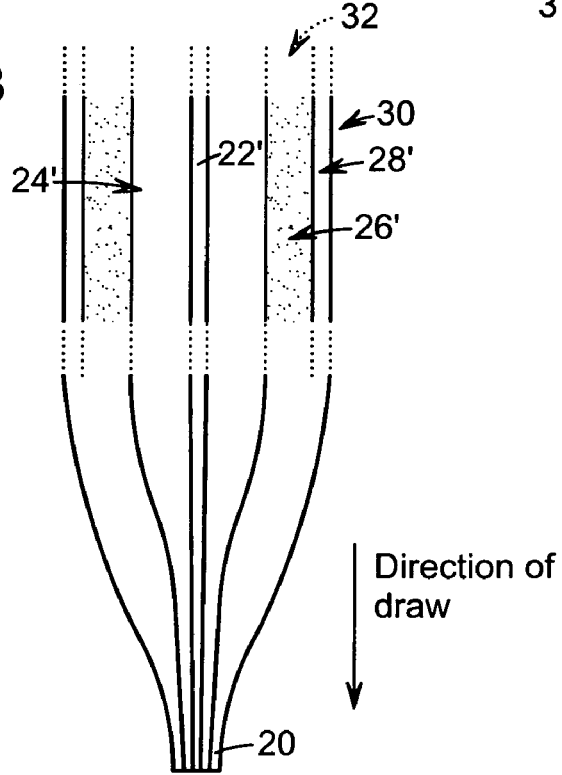
FIG. 3 is a schematic longitudinal sectional view taken through a preform in the process of the preform being drawn to produce the fiber of FIG. 1.

Reference is now made to FIG. 3 for a description of one method that can be used for making an embodiment of the present invention. As an example, the fiber produced in FIG. 3 is taken to be the fiber 20 described above in connection with FIGS. 1 and 2.

As shown in FIG. 3 the fiber 20 is drawn from a later stage preform 30 having a core region 22', an inner cladding region 24', an outer cladding region 26' and an outer region 28'. The preform 30 is drawn in a conventional way whereby the materials of the regions 22', 24', 26' and 28' are greatly decreased in radial dimensions and greatly increased in longitudinal dimensions to create the fiber 20.

The core 22' and inner cladding 24' regions of the preform 30 can be fabricated by any commonly used process for fabricating optical fiber preforms, such as modified chemical vapor deposition (MCVD), vapor axial deposition (VAD), melting, sol-gel, etc. In an early stage of making the preform 30, the core region 22' and the inner cladding region 24' are assembled together with the outer region 28' while leaving an intermediate region, which can be annular air gap or space, between the regions 24' and 28' shown at 32 in FIG. 3. The dimensions of the intermediate region 32 to the inner cladding diameter of the preform will be proportional to the dimensions of the outer cladding thickness to the inner cladding diameter of the fiber. Particles (e.g., silica beads) are disposed in the intermediate region 32. Typically the intermediate region 32 is an air gap that is then filled with the silica beads of known index of refraction and particle shape and size to improve the early stage preform to the later stage preform 30. This assembled structure or later stage preform is then drawn into the fiber 20 to obtain the desired composite fiber structure. During the drawing process, the silica particles will sinter by fusing to one another and the size of the pores or hollows will begin to decrease. The particle size, particle shape, packing density and draw conditions can be varied to achieve different pore sizes, and hence different effective indices of the cladding 26.

In the preceding description of the method of the invention it will be understood that the silica particles can be filled into the intermediate region 32 in the presence of air so that air becomes enclosed in the hollows with pores which exist between the emplaced particles, and so that air is likewise enclosed in the micro-pores or hollows of the cladding 26 of the finished fiber 20. However, if desired, the filling of the silica particles into the empty space 32 may be performed in the presence of some other gas or in the presence of a vacuum so as to have such other gas or vacuum to appear in the micro hollows of the micro-structured cladding 26.

In yet another embodiment of the method of the invention, a mixture of particles having different compositions, for example, silica beads and beads of some other glass composition (e.g. borosilicate beads), can be disposed in the intermediate region 32 of the preform to obtain a cladding having an effective index lower than silica. Such a mixture may provide an integral structure without porosity which may limit fiber strength.

In the making of the fiber 20 it should be noted that the emphasis is not on the dopants in the core 22 or inner cladding 24. The core and, by way of example and not limitation, the inner cladding can be doped with one or more of the following: germania, alumina, titania, phosphorus, boron and one or more rare earths (e.g., erbium ions, ytterbium ions or neodymium ions). The material of the outer cladding 26 can be, for example, either pure silica or doped silica to adjust the net index of refraction.

The present invention can use air and glass mixtures, other gas and glass mixtures, vacuum and/or glass mixtures, and mixtures of different glasses to reduce the index of refraction of the cladding and to obtain increased numerical apertures. For example, it is estimated that a cladding consisting of 25 volume percent air and 75 volume percent silica will give a numerical aperture of 0.5 with pure silica core. It can be further enhanced by doping the core with germania. Use of polymer material in an outer cladding can be avoided, or a polymer outer cladding, if present, can be exposed to less power.

All materials used in fabricating the fiber 20 are preferably as clean as reasonably possible to improve transmission and strength. High purity silica beads such as those obtained by flame hydrolysis, chemical vapor deposition or sol-gel can be used to improve the optical transmission quality. The beads are preferably etched (for example with HF), cleaned (for example with alcohol or other solvents) and rinsed to remove any surface impurities. Similarly, the preform surface and the jacket inner surface are preferably etched, cleaned and rinsed to remove any impurities.

Instead of pure silica beads, doped silica beads can be disposed in the intermediate region 32 to select a particular effective index of refraction. In addition, a mixture of beads of different compositions and different particle size distributions can be used to obtain a wide range of index change. Alternatively a mixture of beads of different indices can be completely sintered (pore free) to obtain an intermediate index in the cladding.

Certain exemplary refractive index profiles that can be useful in fibers according to the invention are shown above. These refractive index profiles are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the MCVD process (assuming that the MCVD process is used to fabricate the optical fiber preform). Also, each of the sections of the refractive index profile corresponding to a particular part of the fiber indicates that the index of refraction is substantially constant for the part. This need not be true in all practices of the invention. As is well known in the art the index of refraction need not be constant. The index of refraction can be varied according to a predetermined function to provide a particular result. For example, it is known in the art to provide a core comprising a graded refractive index profile, where the profile corresponds to a parabola or other suitable function.

Note that, as described herein, a first part (e.g., a cladding) being "disposed about" a second part (e.g., a core), means that the first region surrounds, at least partially, the second part. Often the first part will surround the second part, and will contact the second part.

One of ordinary skill in the art understands that a material or element can be combined with or incorporated into another material, such as host material, according to a chemical formulation that depends on materials in question and/or on processing parameters. For example, when the host material is silica glass, most of the germanium is understood to be typically incorporated as $GeO_2$. Similarly, it is understood that boron is typically incorporated as $B_2O_3$. However, the invention is not limited to glass hosts or silica glass hosts, and can be practiced with other types of materials as host, such as plastics or other types of glasses, such as chalcogenide glasses or fluoride or phosphate glasses, wherein germanium or other elements are incorporated into different compounds than those specifically noted above. Stating that a fiber includes a material, such as boron, for example, means that the material is included in some form in the fiber, where it is understood that the form can be different, depending on the circumstances.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision.

Having described the invention, what is claimed as new and to be secured by Letters Patent is:

1. An optical fiber having a length, comprising:
   a core; and
   at least one cladding disposed about the core, said one cladding comprising at least first volumetric regions having a first refractive index $n_1$ and second volumetric regions having a second refractive index $n_2$, different from $n_1$,
   said first and second volumetric regions in any cross-section taken through said fiber being randomly intermingled with one another, the random intermingling of the first and second volumetric regions changing with changes in the location of the cross-section along the length of the fiber.

2. An optical fiber as defined in claim 1, wherein:
   for substantially any line extending parallel to said core and in said one cladding, the line will pass at least once from one of the volumetric regions to a volumetric region having a different index.

3. An optical fiber as defined in claim 2, wherein:
   said first volumetric regions of silica-based material are fused to one another to form a sintered body defining said hollows.

4. An optical fiber as defined in claim 3, wherein:
   said hollows contain air.

5. An optical fiber as defined in claim 3, wherein:
   said hollows are empty.

6. An optical fiber as defined in claim 3, wherein:
   said hollows contain a gas.

7. An optical fiber as defined in claim 1, wherein:
   said fiber has an inner cladding disposed about the core and an outer cladding disposed about the inner cladding,
   said inner cladding being comprised of a silica-based material, and
   said one cladding is said outer cladding.

8. An optical fiber as defined in claim 7, wherein:
   said outer cladding is surrounded by a sheath made of a silica-based material.

9. An optical fiber as defined in claim 8, wherein:
   at least said first volumetric regions of said outer cladding are made of a silica-based material.

10. An optical fiber as defined in claim 9 wherein:
    said first volumetric regions of said outer cladding are fused to one another to form a sintered body and said second volumetric regions are hollows in said sintered body.

11. An optical fiber as defined in claim 8, wherein:
    both said first and second volumetric regions are made of silica-based materials.

12. An optical fiber as defined in claim 11, wherein:
    said first and second volumetric regions are fused to one another.

13. An optical fiber defined in claim 1, wherein:
    said one cladding contains essentially no volumetric regions other than said first and second volumetric regions.

14. An optical fiber as defined in claim 1, wherein:
    said first volumetric regions are comprised of a first silica-based material of refractive index $n_1$,
    said second volumetric regions are comprised of a second silica-based material of refractive index $n_2$, and
    said first and second volumetric regions are fused to one another to form a rigid body.

15. An optical fiber as defined in claim 1, wherein:
    said one cladding is located immediately adjacent to said core.

16. An optical fiber as defined in claim 1, wherein:
    said fiber has an inner cladding disposed about the core and an outer cladding disposed about the inner cladding, and
    said one cladding is said inner cladding.

17. An optical fiber as defined in claim 1, wherein:
    said fiber has an inner cladding disposed about the core and an outer cladding disposed about the inner cladding, and
    said one cladding is said outer cladding.

18. An optical fiber having a length, said fiber comprising:
    a core;
    a first cladding disposed about the core;

a second cladding disposed about the first cladding, said second cladding including first volumetric regions having a first refractive index and second volumetric regions having a second index of refraction that is different than said first index of refraction, said second cladding having an effective index of refraction that is less than one of said indices of refraction, and wherein said at least some of said first volumetric regions are truncated such that they do not extend within said fiber for the entire length.

19. An optical fiber as defined in claim 18 wherein one of said first and second volumetric regions comprises empty hollows.

20. An optical fiber as defined in claim 18 wherein one of said first and second volumetric regions comprises hollows containing a gas.

21. An optical fiber as defined in claim 18 wherein one of said first and second volumetric regions comprises hollows containing air.

22. A method of making an optical fiber having a length and having at least one cladding, the method comprising the steps of:
making an early stage preform having an elongate core made of a first silica-based material, an outer region disposed about the core, and an intermediate region located radially inwardly of the outer region, improving the early stage preform to a later stage preform by at least disposing first particles in the intermediate region so that the later stage preform includes in the intermediate region first volumetric regions constituted by the first particles intermingled with the second volumetric regions constituted by something other than the particles of the first volumetric regions; and
drawing an optical fiber from a preform that includes at least the later stage preform.

23. The method defined in claim 22, wherein:
disposing particles in the intermediate region includes selecting the particles to be of such sizes and shapes, and selecting the conditions attending the disposing of the particles into the intermediate region so that after the intermediate region includes the particles hollows are intermixed with the particles in the intermediate region.

24. The method defined in claim 23, wherein:
selecting the conditions includes mixing a gas with the particles as they are disposed in the intermediate region so that the hollows include the gas.

25. The method defined in claim 24, wherein:
the gas is air.

26. The method defined in claim 22, comprising:
disposing second particles with the first particles, the second particles having an different index of refraction than the first particles, the second volumetric regions being constituted by the second particles.

* * * * *